(12) United States Patent
Eastham

(10) Patent No.: US 6,954,798 B2
(45) Date of Patent: Oct. 11, 2005

(54) CONTENT-BASED ROUTING OF DATA FROM A PROVIDER TO A REQUESTOR

(75) Inventor: Bryant Eastham, Salt Lake City, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/229,961

(22) Filed: Aug. 28, 2002

(65) Prior Publication Data

US 2004/0044780 A1 Mar. 4, 2004

(51) Int. Cl.[7] ............................................. G06F 13/00
(52) U.S. Cl. ...................... 709/238; 709/202; 709/218; 709/223
(58) Field of Search ............................... 709/202, 218, 709/223, 238, 203, 217, 219, 225, 226

(56) References Cited

U.S. PATENT DOCUMENTS

| | | | | |
|---|---|---|---|---|
| 6,021,419 A | * | 2/2000 | Clarke et al. ............... | 708/300 |
| 6,139,177 A | | 10/2000 | Venkatraman et al. ...... | 364/188 |
| 6,230,205 B1 | * | 5/2001 | Garrity et al. .............. | 709/231 |
| 6,304,906 B1 | * | 10/2001 | Bhatti et al. ................ | 709/227 |
| 6,490,615 B1 | * | 12/2002 | Dias et al. .................. | 709/219 |
| 6,560,233 B1 | * | 5/2003 | Hatanaka et al. ........... | 370/401 |
| 6,598,077 B2 | * | 7/2003 | Primak et al. .............. | 709/219 |
| 6,601,101 B1 | * | 7/2003 | Lee et al. .................... | 709/227 |
| 6,707,889 B1 | * | 3/2004 | Saylor et al. ............ | 379/88.04 |
| 6,728,715 B1 | * | 4/2004 | Astley et al. ................ | 707/10 |
| 2002/0165979 A1 | * | 11/2002 | Vincent ...................... | 709/239 |
| 2004/0003064 A1 | * | 1/2004 | Astley et al. ............... | 709/223 |
| 2004/0019645 A1 | * | 1/2004 | Goodman et al. .......... | 709/206 |

* cited by examiner

Primary Examiner—Viet D. Vu
(74) Attorney, Agent, or Firm—Madson & Metcalf

(57) ABSTRACT

A system for content-based routing of data from a provider is disclosed. The system includes a provider that provides provider data and a requestor that has requested the provider data. The system also includes a plurality of intervening access nodes. Each intervening access node has a network interface, a filter and active communications information. The filter is for applying to all incoming communications being received via the network interface to filter out all unwanted communications. The active communications information specifies any provider data being sent through the intervening access node. The plurality of intervening access nodes are configured to relay communications of interest through an intervening access node network and to configure filters based on the communications of interest.

19 Claims, 7 Drawing Sheets

CONTENT-BASED ROUTING OF DATA FROM A PROVIDER TO A REQUESTOR

TECHNICAL FIELD

This invention relates generally to computer networks, and is more particularly directed toward content-based routing of data from a provider to a requestor.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc.

Some embedded systems may provide data and/or services to other computing devices using a computer network. Sometimes the computer networks providing the communication of this information do not provide sufficient and/or desirable means for optimizing the routing of this communication. Benefits may be realized if systems and methods were provided to route communications from a provider to a requester based on content.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 6 is a flow diagram of an embodiment of a method of a requestor instructing the intervening access node network regarding which communications the requester is interested in;

DETAILED DESCRIPTION

Figure 1:
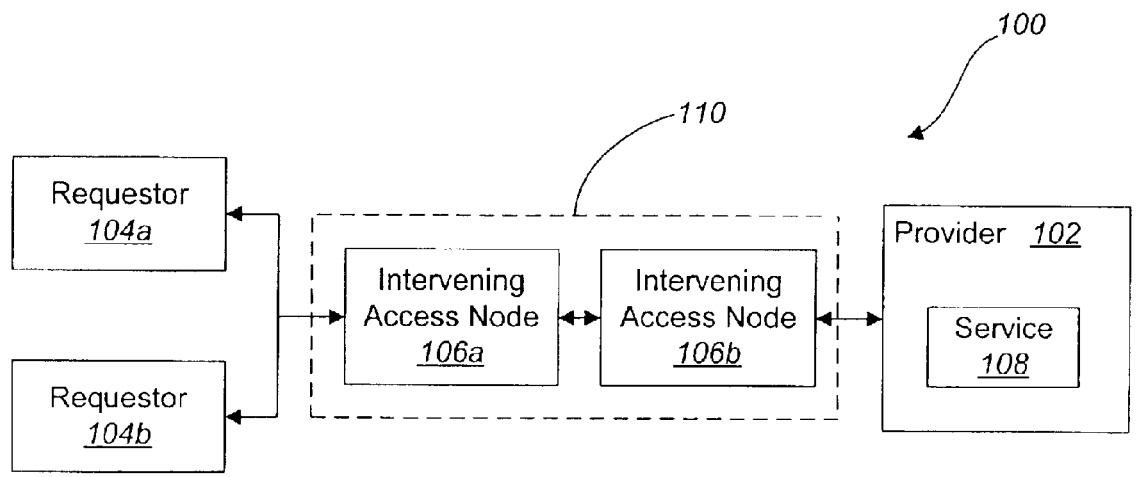
FIG. 1 is a network block diagram illustrating two intervening access nodes in a computer network.

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

A system for content-based routing of data from a provider is disclosed. The system includes a provider that provides provider data and a requestor that has requested the provider data. The system also includes a plurality of intervening access nodes. Each intervening access node has a network interface, a filter and active communications information. The filter is for applying to all incoming communications being received via the network interface to filter out all unwanted communications. The active communications information specifies any provider data being sent through the intervening access node. The plurality of intervening access nodes are configured to relay communications of interest through an intervening access node network and to configure filters based on the communications of interest.

Embedded devices may be used with the systems disclosed. For example, the provider may be an embedded device. In addition, one or more of the requesters may be embedded devices. Additionally, the one or more intervening access nodes may also be embedded devices.

The plurality of intervening access nodes may comprise the intervening access node network.

Systems and methods herein may be used with web services. The provider may be providing one or more web services and the provider data may relate to the one or more web services. The provider may be providing one or more web services using SOAP.

The active communications information may include a data ID identifying data being received and a next node describing where the data being received is to be sent.

An embedded intervening access node is also disclosed that is configured for use in a system for content-based routing of data from a provider that provides provider data to a requestor that has requested the provider data. The embedded intervening access node includes a processor, a network interface in electronic communication with the processor and memory in electronic communication with the processor for storing data. The embedded intervening access node also includes a filter, active communications information and program instructions. The filter is for applying to all incoming communications being received via the network interface to filter out all unwanted communications. The active communications information specifies any provider data being sent through the intervening access node. The program instructions are stored in the memory and implement a method to relay communications of interest through an intervening access node network and to configure filters based on the communications of interest. The method implemented by the program instructions may determine a type of communication based on a type tag.

A system for content-based routing of data from an embedded provider is disclosed. The system includes an embedded provider that provides provider data and a requester that has requested the provider data. The system also includes a plurality of intervening access nodes. Each intervening access node has a network interface, a filter and active communications information. The filter is for applying to all incoming communications being received via the network interface to filter out all unwanted communications. The active communications information specifies any provider data being sent through the intervening access node. The plurality of intervening access nodes are configured to relay communications of interest through an intervening access node network and to configure filters based on the communications of interest.

A method is also disclosed for routing data communications from a provider to a requester subscribed to a service from the provider wherein the requester is in electronic communication with the provider through a computer network. Provider data that relates to a web service by an embedded provider is provided. A requestor requests the service. Information is communicated between the requestor and the embedded provider by a plurality of intervening access nodes on the computer network. Each intervening access node has a network interface, a filter and active communications information. The filter is for applying to all incoming communications being received via the network interface to filter out all unwanted communications. The active communications information specifies any provider data being sent through the intervening access node. The plurality of intervening access nodes are configured to relay communications of interest through an intervening access node network and to configure filters based on the communications of interest.

FIG. 1 is a network block diagram illustrating two intervening access nodes in the network 100. A provider 102 is in electronic communication with the network 100. The network embodiment 100 of FIG. 1 includes two requestors 104 in electronic communication with the network 100. The intervening access nodes 106 are also on the network 100. There may be more nodes on the network 100.

An intervening access node 106 is a network node that provides features and services to the network 100. An intervening access node 106 may be used in a variety of ways. For example, an intervening access node 106 may be present on a network to provide services to computers, applications and/or objects on the network 100. An intervening access node 106 may also be used to provide a protocol converter. An intervening access node 106 may be embedded or it 106 may be large enough to handle enterprise traffic.

One feature that an intervening access node 106 may include relates to object refinement. Object refinement refers to the situation where an intervening access node 106 places itself in place of an object and provides different implementations of the same interfaces. This allows, among other things, for problems in the implementation of an interface to be fixed without changing the actual end provider of the interface.

An additional feature of an intervening access node 106 is that of object augmentation. Object augmentation is where the intervening access node 106 adds new interfaces to an object that the end provider does not support.

In current design, the intervening access node 106 does not differentiate between clients and devices, so any service added is available to any (authorized) connected entity or node.

The network as shown in FIG. 1 may inherit many features of web services. Web services are accessed using web protocols, usually HTTP and SOAP. The architecture is based on the peer-to-peer paradigm of networking.

Multiple intervening access nodes 106 in communication with one another form an intervening access node network 110. To requesters 104 and/or providers 102, the one or more intervening access nodes 106 of the intervening access node network 110 appear as a single intervening access node 106. The size or number included in the intervening access node network 110 is transparent to providers 102 and/or requesters 104.

A provider 102 is a node on the network 100 that is the source of a service 108. A requester 104 is a node on the network 100 that is the user of the service 108. A requester 104 is a software entity implemented on a node that may directly discover a provider 102 and use the aspects of service(s) 108 to control or interact with it.

The service 108 may be any kind of service that may be provided by a computing device. Some possible examples of services 108 include providing temperature data from a location, providing surveillance data, providing weather information, providing an audio stream, providing a video stream, etc. Those skilled in the art will appreciate the many different kinds of services and/or data that may be provided over a computer network 100 from a provider 102.

The provider 102 may be an embedded provider. An embedded provider is a provider 102 being implemented on an embedded device. An embedded device is a type of computing device that does not include all the same components associated with a typical desktop computer. For example, some embedded devices do not include monitors, others do not include a keyboard or a mouse, and some embedded devices do not include either a monitor or a keyboard/mouse. Many embedded devices are microcontroller-based devices, i.e., the central processor for the embedded device is a microcontroller. Embedded devices will be discussed in relation to FIG. 9.

The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
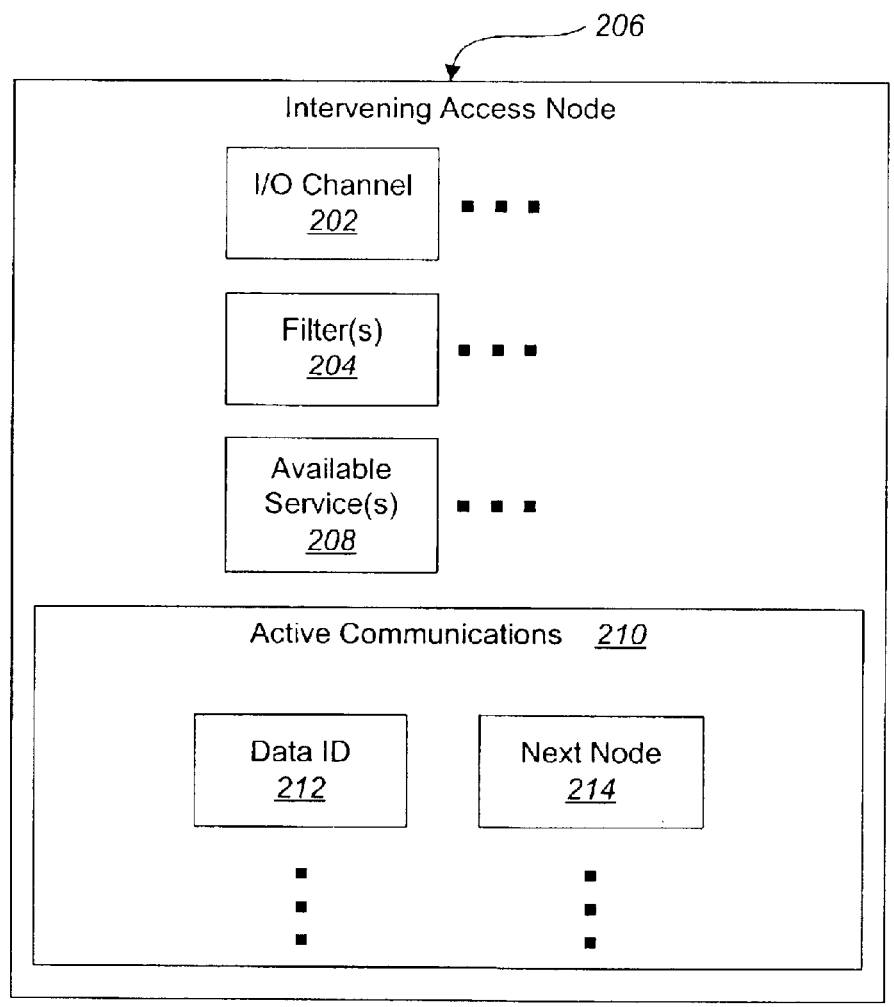
FIG. 2 is a block diagram of an embodiment of an intervening access node.

FIG. 2 is a block diagram of an embodiment of an intervening access node 206. The intervening access node 206 may have one or more I/O channels 202 for communicating with other nodes. For each I/O channel 202, the intervening access node 206 also includes a filter 204. The filter indicates if the intervening access node 206 is interested in communications from the I/O channel 202 and/or which specific communications the intervening access node 206 is interested in. The filter 204 may be configured to allow all communications to come in through the I/O channel 202 and be processed. In addition, the filter 204 may be configured not to allow any communications to come in through the I/O channel 202 and be processed. The filter 204 may also be configured to listen to and process certain communications (according to an identification of the data, according to the source, according to content, etc.) and to ignore other communications. Through use of the filter, the intervening access node 206 only listens to what it is interested in. As a result, if the intervening access node 206 does not need to listen to and/or process certain communications, these communications are simply ignored.

The intervening access node 206 may be notified of services 108 that are available on the network 100. When the intervening access node 206 becomes aware of these services 108, it 206 tracks this information by storing one or more available services 208. By storing the information about what services are available, the intervening access node 206 may respond to queries regarding service availability.

The intervening access node 206 stores the information necessary for it 206 to send data toward its destination. There are a variety of ways in which the intervening access node 306 may store information relating to active communications 210 to track where different data transmissions are to be sent. The intervening access node 206 of FIG. 2 stores a data ID 212 and a next node 214. The data ID 212 field identifies the data or data stream coming into the intervening access node 206. The next node 214 field indicates where this intervening access node 206 is to send the data, that is, it indicates the next node that is to receive the data.

Figure 3:
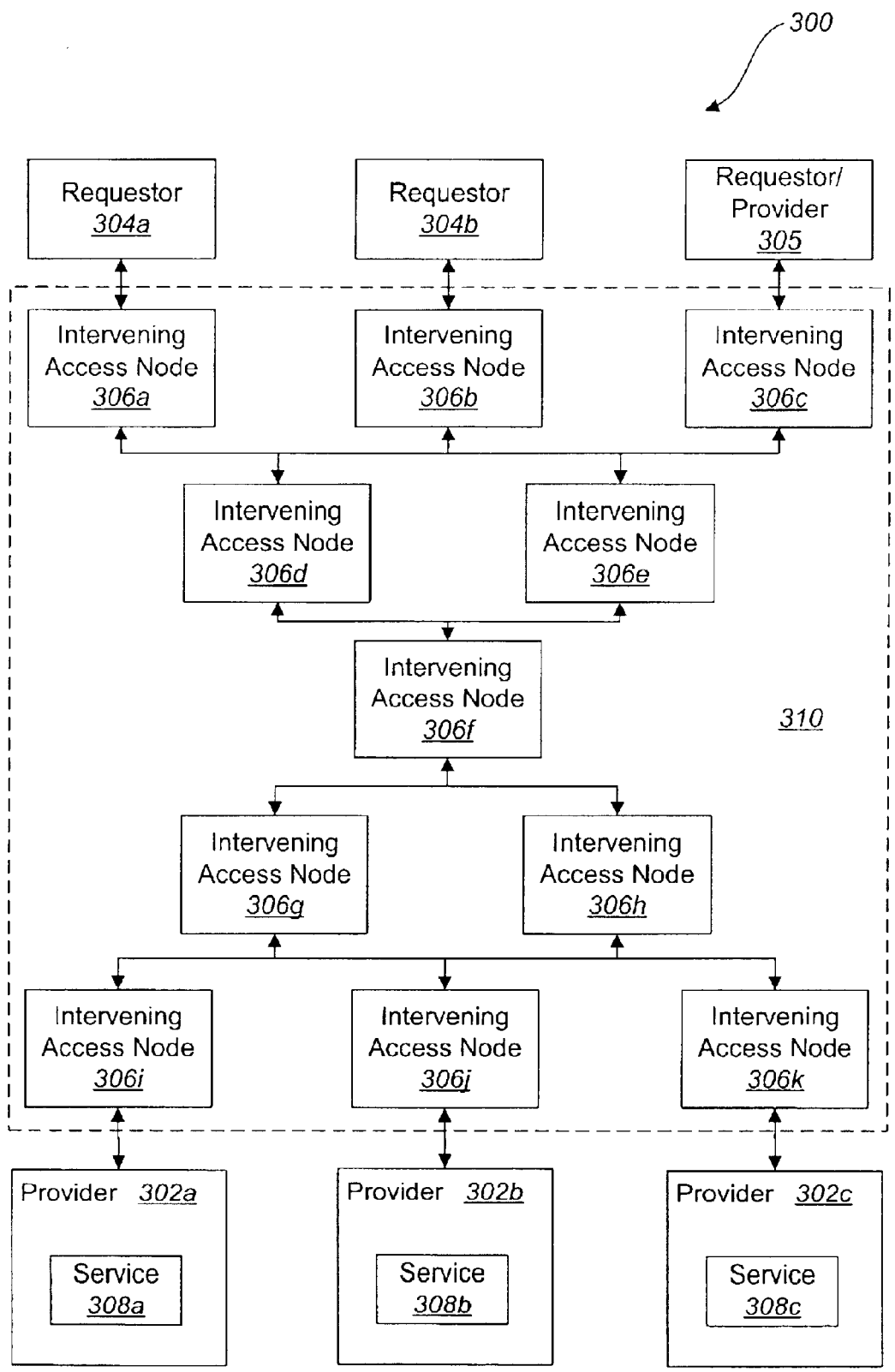
FIG. 3 is a network block diagram illustrating several intervening access nodes in a computer network.

Any number of intervening access nodes 106 may be used in a network 100. FIG. 3 illustrates a network 300 that includes a number of intervening access nodes 306 as shown. Three requestors 304 are in electronic communication with the intervening access nodes 306. In the network embodiment 300 shown in FIG. 3, the three requestors 304 may all request the services 308 being provided by one or more of the providers 302. The data from the services 308 is sent through the intervening access node network 310.

The intervening access node network 310 of FIG. 3 operates similarly to the intervening access node network 110 of FIG. 1. In typical operation, the requesters 104, 304 and the providers 102, 302 would not distinguish between the intervening access node network 110 of FIG. 1 and the intervening access node network 310 of FIG. 3. FIG. 3 also illustrates that a node may serve as both a requestor and a provider, as shown by the illustrated requestor/provider 305. Typically when one intervening access node 306 sends a message to a plurality of other intervening access nodes 306, it does so while at the same time applying a cycle detection or avoidance algorithm in order to ensure that packets don't get forwarded from one node to another infinitely.

Figure 4:
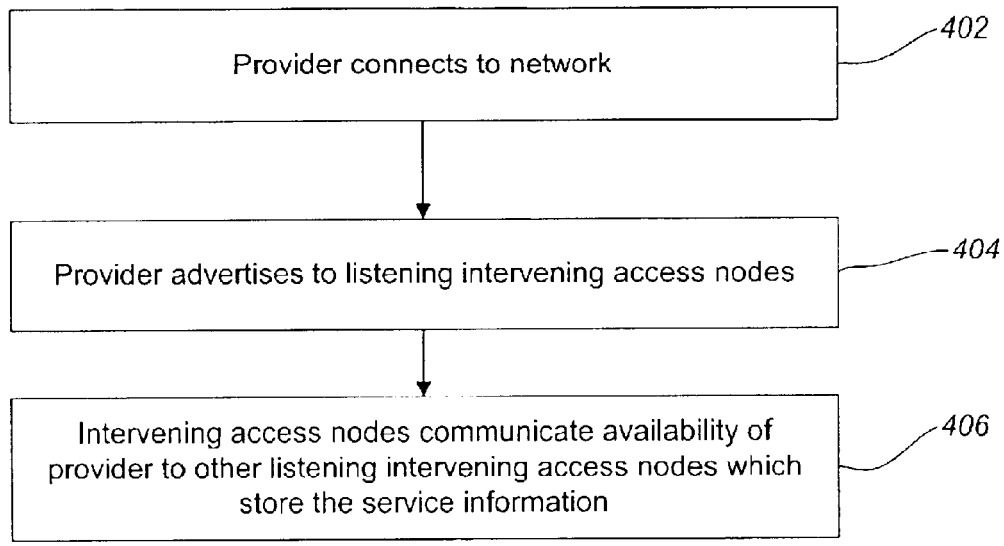
FIG. 4 is a flow diagram of an embodiment of a method of a provider connecting to a network.

FIG. 4 is a flow diagram of an embodiment of a method of a provider 102 connecting to a network 100. The provider 102 connects 402 to the network 100. Then the provider 102 advertises 404 its availability to the network 100. When the provider 102 advertises 404 its availability, its advertisements are received by the intervening access nodes 106 on the network 100. The intervening access nodes 106 then communicate the availability of the provider 102 to any other intervening access nodes 106 and/or requesters 104 that have subscribed to receive availability notifications. The new provider advertisement that is communicated to one or more nodes may be referred to as an availability notification. These availability notifications may be subscribed to like any other service that may be subscribed to.

One or more intervening access nodes 106 may be configured to serve as a directory. A directory is a node that provides information to other nodes regarding availability of providers and how to communicate with such providers. Any intervening access nodes 106 serving as directories would store the provider 102 information in the directory.

The roles of requestor and provider can be taken on by devices and software nodes connected to intervening access nodes 106. In addition, an intervening access node 106 may be a requestor and/or a provider. For example, the intervening access node 106 may be a requestor/provider when setting up the communication between intervening access nodes 106. An intervening access node 106 serves as a requestor when it 106 requests information about providers when it 106 connects to another intervening access node 106. An intervening access node 106 serves as provider when it is providing information about other providers to other intervening access nodes 106.

Figure 5:
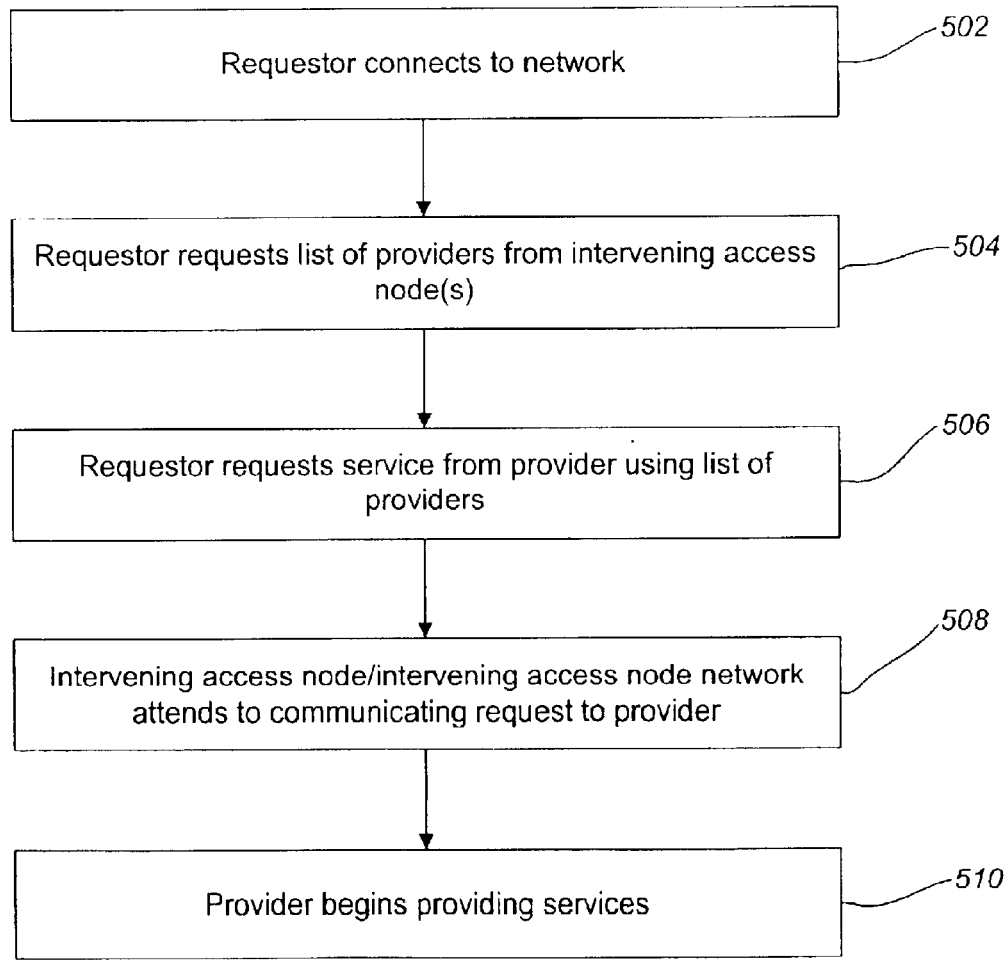
FIG. 5 is a flow diagram of an embodiment of a method of a requester establishing a service communication link with a provider.

FIG. 5 is a flow diagram of an embodiment of a method of a requestor 104 establishing a service communication link with a provider 102. The requester 104 connects 502 to the network 100. Then the requestor 104 may request 504 a list of providers 102 from the intervening access node(s) 106. Using the list of providers 102, the requestor is able to determine what service it needs and it requests 506 the service from a provider 102. The intervening access node network 210 communicates 508 the request from the requestor 104 to the provider 102. The provider 102 then begins providing 510 the service(s) requested.

Figure 6:
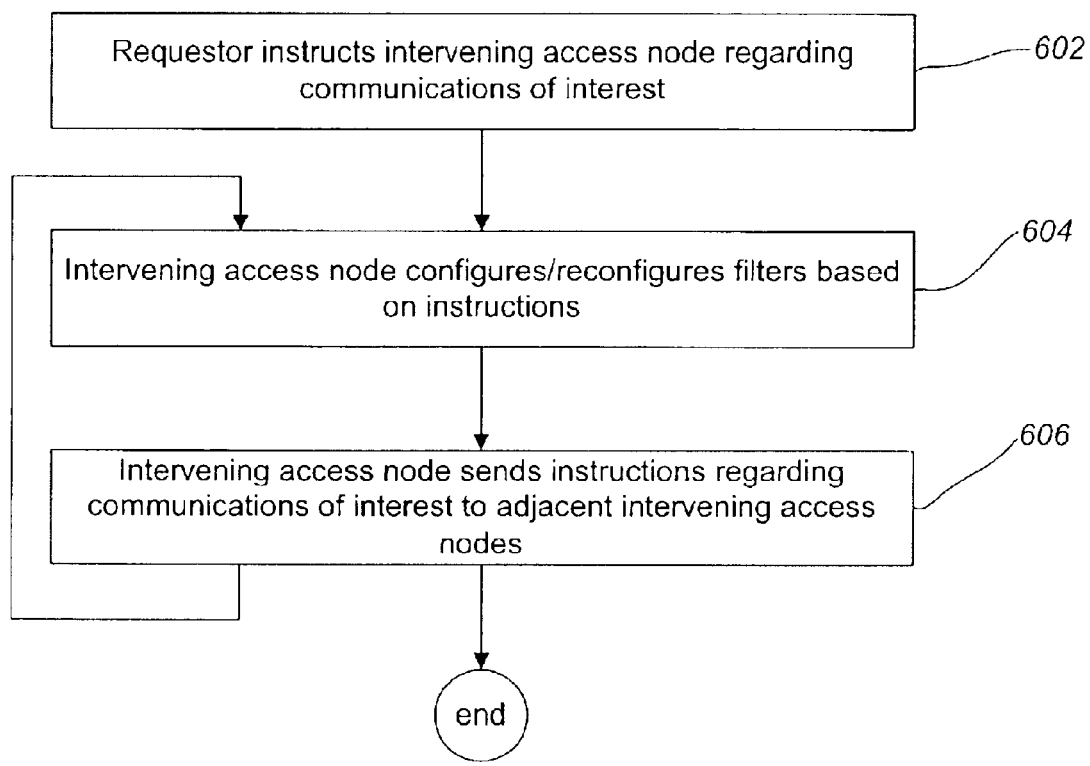

FIG. 6 is a flow diagram of an embodiment of a method of a requestor 104 instructing the intervening access node network 110 regarding which communications the requestor 104 is interested in. The flow diagram of FIG. 6 assumes that the requester 104 is already in communication with an intervening access node 106. The requestor 104 instructs 602 the intervening access node 106 regarding communications of interest. This may be done in various ways. For example, the requester 104 may indicate to the intervening access node 106 that it 104 is interested in all communications. Alternatively, the requestor 104 may indicate that it is not interested in any communications. In addition, the requester 104 may identify specific communications it is interested in. After the requestor 104 instructs 602 the intervening access node 106, the intervening access node 106 configures 604 and/or reconfigures 604 its filters based on the instructions received. The intervening access node 106 then sends 606 instructions regarding communications of interest to adjacent intervening access nodes 106. The intervening access node 106 instructions regarding communications of interest may be the same as the requestor's 104 instructions or they may be different. For example, if the intervening access node 106 was directly connected to only one requestor 104 and was not connected to any other nodes that were interested in any other communications, the intervening access node's 106 instructions may be substantially the same as the requestor's 104 instructions. However, if the intervening access node 106 was connected to multiple requesters 104 and/or it was connected to other nodes that were interested in additional communications, the intervening access node's 106 instructions would take these additional wanted communications into account before it sent its intervening access node's instructions on to the next node. As shown in FIG. 6, instructions regarding communications of interest would continue to be sent throughout the intervening access node network 110 until all necessary intervening access nodes 106 had been notified.

Figure 7:
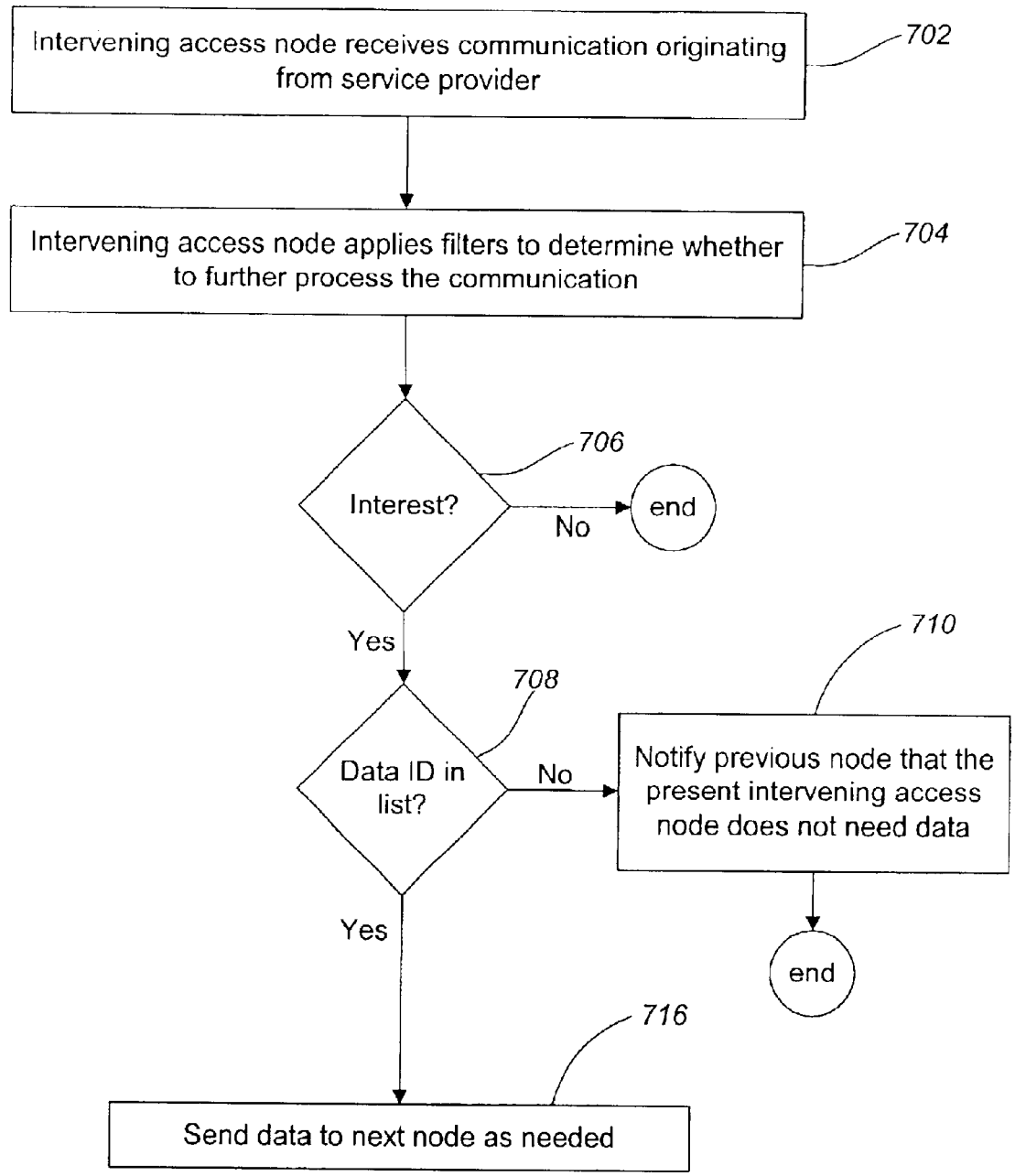
FIG. 7 is a flow diagram of an embodiment of a method of an intervening access node processing data received from a node in the communication pathway to the provider of the service originating the data.

FIG. 7 is a flow diagram of an embodiment of a method of an intervening access node 106 processing data received from a node in the communication pathway to the provider 102 of the service originating the data (referred to as an "upstream node"). The intervening access node 106 receives 702 data (originating from a service provider 102) from the upstream node. The intervening access node 106 then applies 704 its filters to determine whether the communication should be further processed. This may be done by using to the filters to determine 706 if the intervening access node 106 is interested in the communication. If there is no interest, the node 106 may not perform any further processing for the communication. If there is interest in the communication, then the intervening access node 106 determines 708 whether it should be receiving the data. Depending on how the intervening access node 106 tracks the data or channels it is receiving, it 106 may determine this in various ways. For the embodiment of the intervening access node 106 shown in FIG. 2, the node 106 may check the data ID 212 field to determine whether it should be receiving the data. If the intervening access node 106 determines that it should not be receiving the data, it notifies 710 the upstream node. If the intervening access node 106 determines that it should be receiving the data, the node 106 may send 716 the data on to the next node toward the requestor 104 (referred to as a "downstream node").

Figure 8:
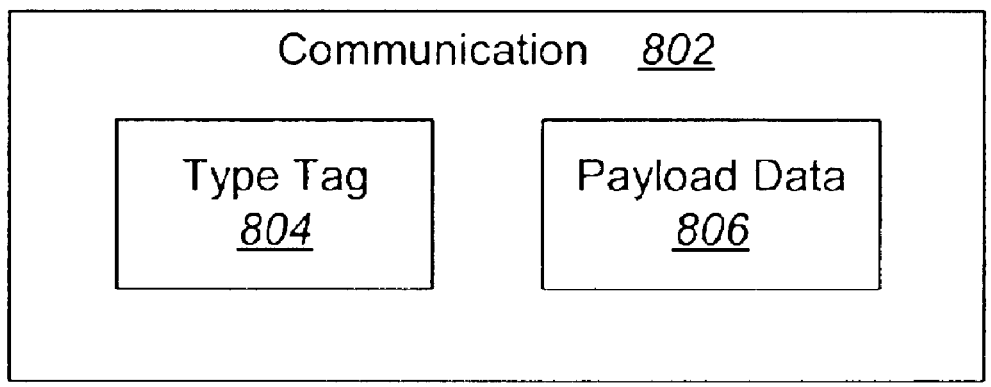
FIG. 8 is a block diagram of an embodiment of a communication.

FIG. 8 is a block diagram of an embodiment of a communication that may be sent from a provider 102 to a requester 104. Depending on what systems, software, protocols, etc. are being used to send the communication, many additional fields may be included that are not shown in FIG. 8 but which would be appreciated by those skilled in the art. The communication 802 may include a type tag 804 and a payload 806. The type tag 804 identifies the type of message it is. There are different types of messages that may be sent and received. For example, some types of messages that may be used are (a) a message type that indicates the message contains payload 806 data relating to newly available providers, (b) a message type that indicates the message contains payload 806 data relating to an alarm of some kind, (c) a message type that indicates the message contains payload 806 data relating to a request for a subscription, (d) a message type that indicates the message contains payload 806 data relating an updated value for a certain parameter, data, object, etc. It will be appreciated by those skilled in the art that new categories may be added, as needed. The type tag 804 may be compared with a filter 204 to determine whether a communication is of interest, but the filter 204 may be configured using many other parameters besides the type tag 804.

Figure 9:
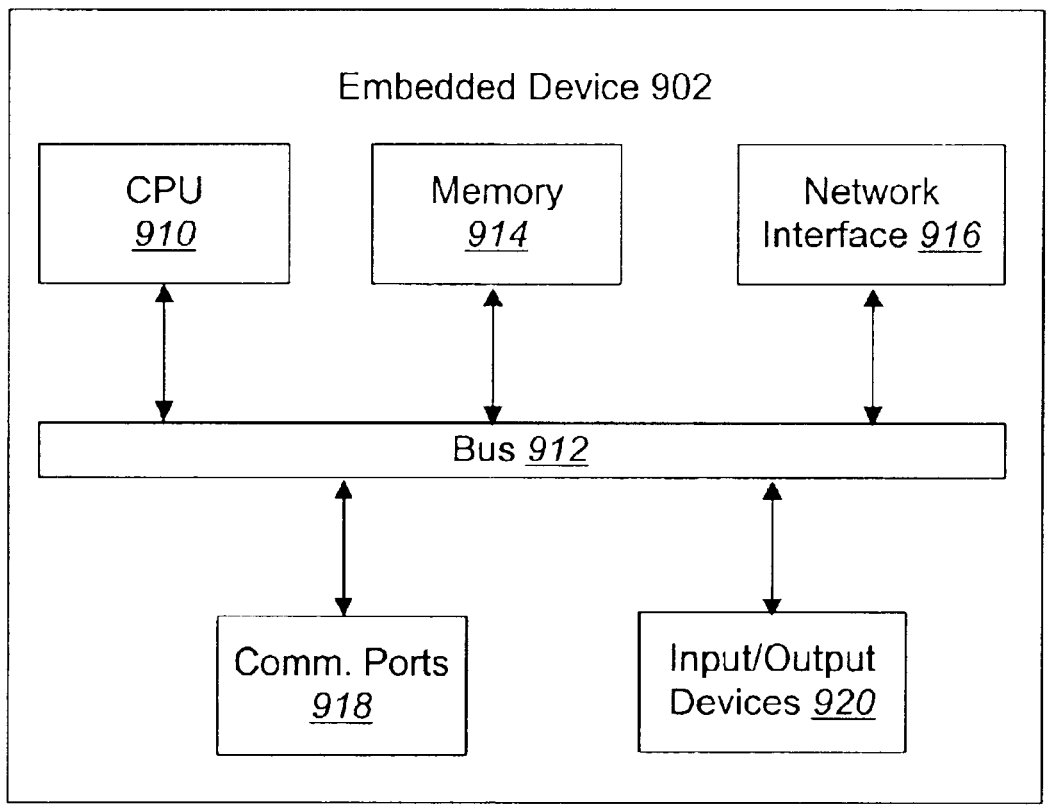
FIG. 9 is a block diagram of hardware components that may be used in an embodiment of an embedded device.

FIG. 9 is a block diagram of hardware components that may be used in an embodiment of an embedded device which may be used as either an embedded provider or as an embedded requester.

A CPU 910 or processor may be provided to control the operation of the embedded device 902, including the other components thereof, which are coupled to the CPU 910 via a bus 912. The CPU 910 may be embodied as a microprocessor, microcontroller, digital signal processor or other device known in the art. The CPU 910 performs logical and arithmetic operations based on program code stored within the memory 914. In certain embodiments, the memory 914 may be on-board memory included with the CPU 910. For example, microcontrollers often include a certain amount of on-board memory.

The embedded device 902 may also include a network interface 916. The network interface 916 facilitates communication between the embedded device 902 and other devices connected to the network 100. The network 100 may be a pager network, a cellular network, a global communications network, the Internet, a computer network, a telephone network, etc. The network interface 916 operates according to standard protocols for the applicable network 100.

The embedded device 902 may also include memory 914. The memory 914 may include a random access memory (RAM) for storing temporary data. Alternatively, or in addition, the memory 914 may include a read-only memory (ROM) for storing more permanent data, such as fixed code and configuration data. The memory 914 may also be embodied as a magnetic storage device, such as a hard disk drive. The memory 914 may be any type of electronic device capable of storing electronic information.

The embedded device 902 may also include communication ports 918, which facilitate communication with other devices. The embedded device 902 may also include input/output devices 920, such as a keyboard, a mouse, a joystick, a touchscreen, a monitor, speakers, a printer, etc.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to anther. In these applications, providers typically act as small servers that report certain information in response to a requestor. Providers can also be set up to publish their state information to subscribers. A requestor may ask for periodic reports or for updates whenever the state changes, perhaps with some means of limiting how often updates are to be sent. Providers can be set up to notify requestors when some event or exceptional condition occurs.

Another example of a device network application is remote control, where requestors are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved a requestor may use a web browser, pager or even a WAP-enabled cell phone to communicate with a provider in a more or less interactive manner. As the number of providers grows, however, these methods may become unworkable and requestors may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for content-based routing of data from a provider, the system comprising:
    a provider that provides provider data;
    a requestor that has requested the provider data;
    a plurality of intervening access nodes, wherein each intervening access node comprises:
        a network interface;
        a filter for applying to all incoming communications being received via the network interface to listen to certain communications and to filter out all unwanted communications, wherein the filter is configured to listen to and relay certain communications of interest when a request for a subscription to the provider data that relates to the certain communications of interest is received requesting the certain communications of interest; and
        active communications information specifying any provider data being sent through the intervening access node;
    and wherein the plurality of intervening access nodes are configured to relay communications of interest through an intervening access node network by sending instructions to adjacent intervening access nodes, to the requestor, or to the provider and to configure filters based on the communications of interest; and wherein the intervening access nodes are configured such that when they send a message to another intervening access node, the sending node can apply an algorithm to ensure that the message is not forwarded on from one node to another infinitely.

2. The system as defined in claim 1, wherein the provider is an embedded device.

3. The system as defined in claim 1, wherein at least one requestor is an embedded device.

4. The system as defined in claim 1, wherein the plurality of intervening access nodes comprise the intervening access node network.

5. The system as defined in claim 1, wherein the provider is providing one or more web services and wherein the provider data relates to the one or more web services.

6. The system as defined in claim 1, wherein the active communications information comprises a data ID identifying data being received and a next node describing where the data being received is to be sent.

7. The system as defined in claim 1, wherein at least one of the intervening access nodes is an embedded device.

8. An embedded intervening access node configured for use in a system for content-based routing of data from a provider that provides provider data to a requestor that has requested the provider data, the embedded intervening access node comprising:
- a processor;
- a network interface in electronic communication with the processor;
- memory in electronic communication with the processor for storing data;
- a filter for applying to all incoming communications being received via the network interface to listen to certain communications and to filter out all unwanted communications, wherein the filter is configured to listen to and relay certain communications of interest when a request for a subscription to the provider data that relates to the certain communications of interest is received requesting the certain communications of interest;
- active communications information specifying any provider data being sent through the intervening access node; and
- program instructions stored in the memory and implementing a method to relay communications of interest through an intervening access node network by sending instructions to adjacent intervening access nodes, to the requestor, or to the provider and to configure filters based on the communications of interest and wherein the intervening access node is configured such that when it sends a message to another intervening access node, the node can apply an algorithm to ensure that the message is not forwarded on from one node to another infinitely.

9. The embedded intervening access node as defined in claim 8, wherein the provider is providing one or more web services and wherein the provider data relates to the one or more web services.

10. The embedded intervening access node as defined in claim 8, wherein the active communications information comprises a data ID identifying data being received and a next node describing where the data being received is to be sent.

11. The embedded intervening access node as defined in claim 8, wherein the method implemented by the program instructions determines a type of communication based on a type tag.

12. A system for content-based routing of data from a provider to a requestor, the system comprising:
- an embedded provider that provides provider data;
- a requestor that has requested the provider data;
- a plurality of intervening access nodes, wherein each intervening access node comprises:
  - a network interface;
  - a filter for applying to all incoming communications being received via the network interface to listen to certain communications and to filter out all unwanted communications, wherein the filter is configured to listen to and relay certain communications of interest when a request for a subscription to the provider data that relates to the certain communications of interest is received requesting the certain communications of interest; and
  - active communications information specifying any provider data being sent through the intervening access node;
- and wherein the plurality of intervening access nodes are configured to relay communications of interest through an intervening access node network by sending instructions to adjacent intervening access nodes, to the requestor, or to the provider and to configure filters based on the communications of interest and wherein the intervening access nodes are configured such that when they send a message to another intervening access node, the sending node can apply an algorithm to ensure that the message is not forwarded on from one node to another infinitely.

13. The system as defined in claim 12, wherein the plurality of intervening access nodes comprise the intervening access node network.

14. The system as defined in claim 12, wherein the provider is providing one or more web services using SOAP and wherein the provider data relates to the one or more web services.

15. The system as defined in claim 14, wherein the active communications information comprises a data ID identifying data being received and a next node describing where the data being received is to be sent.

16. A method for routing data communications from a provider to a requestor subscribed to a service from the provider wherein the requestor is in electronic communication with the provider through a computer network, the method comprising:
- providing provider data that relates to a web service by an embedded provider;
- requesting the service by a requestor;
- communicating information between the requestor and the embedded provider by a plurality of intervening access nodes on the computer network, wherein each intervening access comprises:
  - a network interface;
  - a filter for applying to all incoming communications being received via the network interface to listen to certain communications and to filter out all unwanted communications, wherein the filter is configured to listen to and relay certain communications of interest when a request for a subscription to the provider data that relates to the certain communications of interest is received requesting the certain communications of interest; and
  - active communications information specifying any provider data being sent through the intervening access node; and
- and wherein the plurality of intervening access nodes are configured to relay communications of interest through an intervening access node network by sending instructions to adjacent intervening access nodes, to the requestor, or to the provider and to configure filters based on the communications of interest and wherein the intervening access nodes are configured such that when they send a message to another intervening access node, the sending node can apply an algorithm to ensure that the message is not forwarded on from one node to another infinitely.

17. The method as defined in claim 16, wherein the requestor is an embedded device.

18. The method as defined in claim 17, wherein the plurality of intervening access nodes comprise the intervening access node network.

19. The method as defined in claim 18, wherein the active communications information comprises a data ID identifying data being received and a next node describing where the data being received is to be sent.

* * * * *

UNITED STATES PATENT AND TRADEMARK OFFICE
CERTIFICATE OF CORRECTION

PATENT NO. : 6,954,798 B2
DATED : October 11, 2005
INVENTOR(S) : Bryant Eastham

It is certified that error appears in the above-identified patent and that said Letters Patent is hereby corrected as shown below:

Title page,
Item [75], Inventor, replace "Salt Lake City" with -- Draper --.

Column 1,
Line 67, replace "requester" with -- requestor --.

Column 2,
Lines 21 and 25, replace "requester" with -- requestor --.

Column 3,
Line 15, replace "requesters" with -- requestors --.
Lines 52, 65 and 66, replace "requester" with -- requestor --.

Column 4,
Lines 56 and 60, replace "requesters" with -- requestors --.
Lines 63 and 64, replace "requester" with -- requestor --.

Column 6,
Line 51, replace "requesters" with -- requestors --.

Column 7,
Lines 3 and 66, replace "requesters" with -- requestors --.
Lines 29, 42, 46 and 50, replace "requester" with -- requestor --.

Column 8,
Lines 36 and 61, replace "requester" with -- requestor --.

Column 9,
Line 38, replace "anther" with -- another --.

UNITED STATES PATENT AND TRADEMARK OFFICE
CERTIFICATE OF CORRECTION

PATENT NO.    : 6,954,798 B2
DATED         : October 11, 2005
INVENTOR(S)   : Bryant Eastham It is certified that error appears in the above-identified patent and that said Letters Patent is hereby corrected as shown below:

Column 12,
Lines 6 and 51, replace "interest and" with -- interest; and --.

Signed and Sealed this

Seventeenth Day of January, 2006

JON W. DUDAS
*Director of the United States Patent and Trademark Office*